United States Patent
Kajino et al.

(10) Patent No.: US 7,040,184 B2
(45) Date of Patent: May 9, 2006

(54) STARTER

(75) Inventors: Sadayoshi Kajino, Nagoya (JP); Youichi Hasegawa, Kasugai (JP); Syuichi Aoki, Oura-gun (JP)

(73) Assignees: Denso Corporation, Kariya (JP); Sawafuji Electric Co., Ltd., Tokyo (JP)

( * ) Notice: Subject to any disclaimer, the term of this patent is extended or adjusted under 35 U.S.C. 154(b) by 479 days.

(21) Appl. No.: 10/627,691

(22) Filed: Jul. 28, 2003

(65) Prior Publication Data

US 2004/0026926 A1 Feb. 12, 2004

(30) Foreign Application Priority Data

Aug. 8, 2002 (JP) ............................. 2002-231499

(51) Int. Cl.
*F01N 11/00* (2006.01)

(52) U.S. Cl. .......................................... 74/7 E; 74/7 R

(58) Field of Classification Search ................ 74/6, 74/7 R, 7 A, 7 E; 280/38; 310/38 R, 48
See application file for complete search history.

(56) References Cited

U.S. PATENT DOCUMENTS 4,989,467 A * 2/1991 Morishita et al. .......... 74/6

6,239,503 B1 * 5/2001 Ikeda et al. ............... 290/38 R
2002/0029644 A1 3/2002 Yamauchi

FOREIGN PATENT DOCUMENTS

| EP | 0 499 955 A1 | 8/1992 |
| JP | A 2000-320438 | 11/2000 |
| JP | A 2002-70702 | 3/2002 |

* cited by examiner

*Primary Examiner*—William C. Joyce
(74) *Attorney, Agent, or Firm*—Oliff & Berridge, PLC

(57) ABSTRACT

A starter capable of preventing the slippage of a clutch at engine starting and of transmitting a higher torque. In the starter, a power transmission device is integrated with a carrier for supporting a planetary gear of a reduction assembly and an output shaft is helical-spline-coupled to the power transmission device. A pinion shaft is fitted over an outer circumference of the output shaft through a first bearing and second bearing and a one-way clutch is provided for transmitting the rotation of the output signal to the pinion shaft. The first bearing is made such that its tip portion protrudes toward the pinion side with respect to a tip portion of a housing bearing in an engaging state of the pinion with a ring gear and, hence, at cranking, the first and second bearings receive a load from the ring gear to the pinion.

6 Claims, 4 Drawing Sheets

STARTER

BACKGROUND OF THE INVENTION

1) Field of the Invention

The present invention relates to a cantilever type starter having a pinion at an end portion of a pinion shaft supported by a housing bearing.

2) Description of the Related Art

As one example of conventional technique, there has been known a starter disclosed in Japanese Patent Laid-Open No. 2000-320438. As FIG. 4 shows, this starter is made up of an output shaft 100 to which a motor rotating force is transmitted through a planetary reduction device, a pinion shaft 120 fitted through a pinion bearing 110 over the output shaft 100, a one-way clutch 130 for transmitting the rotation of the output shaft 100 to the pinion shaft 120, and other components, and is equipped with a pinion 150 at a tip portion (end portion on the opposite side to the motor) of the pinion shaft 120 supported by a housing bearing 140.

The one-way clutch 130 is fitted through a helical spline over the output shaft 100 and, when being pushed out in an opposite-of-motor direction by means of attraction of an electromagnetic switch (not shown) at the time of engine starting, it, together with the pinion shaft 120, moves on the output shaft 100 to make the pinion 150 engage with a ring gear 160.

Meanwhile, since the above-mentioned starter has a structure of the pinion shaft 120 and the one-way clutch 130 being moved on the output shaft 100, when the pinion shaft 120 is moved in the opposite-of-motor direction (in the opposite direction with respect to the motor, i.e., in the left-hand direction in the illustration) on the output shaft 100 at the time of engine starting, the axial position of the pinion shaft 110 (which is inserted into the inner circumference of the pinion shaft 120 under pressure) varies with respect to the output shaft 100. Accordingly, the pinion bearing 110 is required to support a rearward portion with respect to the tip portion of the output shaft in the pinion resting condition. That is, if it supports the tip portion of the output shaft 100 in the pinion resting condition, the pinion shaft 120 deviates from the output shaft 100 when moving on the output shaft 100 in the opposite-of-motor direction.

In the case of the above-mentioned construction, the pinion shaft 11 does not move in the motor-of-opposite direction beyond the housing bearing 140, and it is located on the motor side with respect to the housing bearing 140 or located at generally same axial position as the housing bearing 140. Therefore, if a high load is applied onto the pinion 150 when the pinion 15 engages with the ring gear 160 to start the engine, a load works on the one-way clutch 130 with the housing bearing 140 functioning as a supporting point. At this time, there arises a problem in that, since the pinion shaft 120 inclines by an angle corresponding to each of bearing gaps, a roller 130c half-strikes against an outer portion 130a and an inner portion 130b constituting the one-way clutch 130 to cause the clutch 130 to slip.

In addition, when the one-way clutch 130 moves on the output shaft 100 in the opposite-of-motor direction, a portion of a spline 100a provided on the output shaft 100 is exposed and, hence, water, dust or the like entering into the interior of a housing 170 can be attached onto the exposed portion of the spline 100a, thereby inhibiting the one-way clutch 130 from getting back.

SUMMARY OF THE INVENTION

The present invention has been developed in consideration of these situations, and it is therefore an object of the invention to provide a starter capable of preventing the slippage of the clutch of at the time of the engine starting and of generating a higher torque.

For this purpose, in accordance with an aspect of the present invention, there is provided a starter comprising a power transmission device integrated with a carrier made to support a planetary gear of a planetary reduction assembly, an output shaft spline-fitted in an inner circumference of the power transmission device, a pinion shaft fitted through a pinion bearing over an outer circumferential surface of the output shaft to be rotatable, a pinion provided at an end portion of the pinion shaft on an opposite side to a motor, a one-way clutch for transmitting a rotation of the output shaft to the pinion shaft, and a housing including a housing bearing located between the pinion and the one-way clutch to support the pinion shaft so that the pinion shaft is rotatable and slidable, wherein the output shaft is made to be moved in the opposite-of-motor side direction together with the pinion shaft and the one-way clutch when an engine is placed into a cranking condition so that the pinion engages with a ring gear of the engine.

With this construction, the relative position between the pinion shaft and the output shaft are preventable from varying between the pinion resting condition and the engine starting condition, which improves the degree of freedom of the location of the pinion bearing. That is, it is not always required that the pinion bearing be located on the rearward side with respect to the tip portion of the output shaft in the pinion resting condition, and for example, the pinion bearing can be placed at the tip portion of the output shaft. In this case, as compared to the starter according to the conventional technique, the pinion bearing can be located at further opposite-of-motor side with respect to the housing bearing in the engine starting condition. In consequence, the inclination of the pinion shaft is suppressible when a high load acts on the pinion, which decreases the load to be applied onto the one-way clutch for preventing the clutch slippage and enables the transmission of a higher torque.

In addition, according to another aspect of the present invention, in the starter mentioned above, when the pinion shaft, together with the output shaft, is moved in the opposite-of-motor direction up to a position at which the pinion engages with the ring gear, the pinion-side end portion of the pinion bearing is protruded toward the pinion side with respect to the pinion-side end portion of the housing bearing.

With this construction, the pinion bearing can receive a portion of the load which acts on the pinion in the engine starting condition, which can reduce the inclination of the pinion shaft accordingly. In consequence, the load to be applied onto the one-way clutch is reducible, thereby preventing the slippage of the clutch and enabling the transmission of a higher torque.

Still additionally, according to a further aspect of the present invention, in the above-mentioned starter, the pinion bearing includes a first pinion bearing for supporting an opposite-of-motor side end portion of the output shaft and a second pinion bearing located on the motor side with respect to the first pinion bearing.

With this construction, the first pinion bearing and the second pinion bearing are located between the pinion shaft and the output shaft, which can further reduce the inclination of the pinion shaft occurring when a high load works on the pinion. In this connection, for example, the second pinion bearing can be located on the inner diameter side of an inner portion constituting the one-way clutch.

Yet additionally, according to a further aspect of the present invention, in the foregoing starter, the pinion bearing is made to support a portion between the opposite-of-motor side end portion of the output shaft and the inner portion constituting the one-way clutch.

Since the starter according to the present invention is designed such that the output shaft is moved integrally with the pinion shaft with respect to the power transmission device, the relative position of the pinion bearing does not vary with respect to the pinion shaft and the output shaft between the pinion resting condition and the cranking condition. Therefore, the pinion bearing can be made to be prolonged in an axial direction to support a wide range from the opposite-of-motor side end portion of the output shaft to the inner diameter side of the inner portion. This can further reduce the inclination of the pinion shaft occurring when a high load works on the pinion.

Moreover, according to a further aspect of the present invention, in the aforesaid starter, the one-way clutch has a cylindrical portion to cover an outer diameter portion of the opposite-of-motor end portion of the power transmission device in the pinion resting condition.

With this construction, the opposite-of-motor side end portion of the engaging section between the power transmission device and the output shaft, spline-fitted, is covered with the cylindrical portion thereof, which protects the spline-fitting portion from water, dust or the like entering into the housing.

Still moreover, according to a further aspect of the present invention, in the aforesaid starter, in the output shaft, a spline-made motor-side end portion is recessed into a cylindrical configuration and an end portion of a shaft of an armature is inserted through a bearing into the interior of the cylindrical configuration.

With this construction, since there is no need to confront an end surface of the output shaft with a shaft end surface of the armature in axial directions, a shorter shaft of the starter is achievable.

Yet moreover, since the motor-side end portion of the output shaft is formed into a cylindrical configuration, the weight of the output shaft is reducible. In this case, the total weight of the moving body (the output shaft, the pinion shaft, the pinion, the one-way clutch) moving in the opposite-of-motor direction at the time of the engine starting is reducible, which improves the engagement between the opinion and the ring gear.

BRIEF DESCRIPTION OF THE DRAWINGS

Other objects and features of the present invention will become more readily apparent from the following detailed description of the preferred embodiment taken in conjunction with the accompanying drawings in which.

DESCRIPTION OF THE PREFERRED EMBODIMENTS

An embodiment of the present invention will be described hereinbelow with the reference to the drawings.

Figure 1:
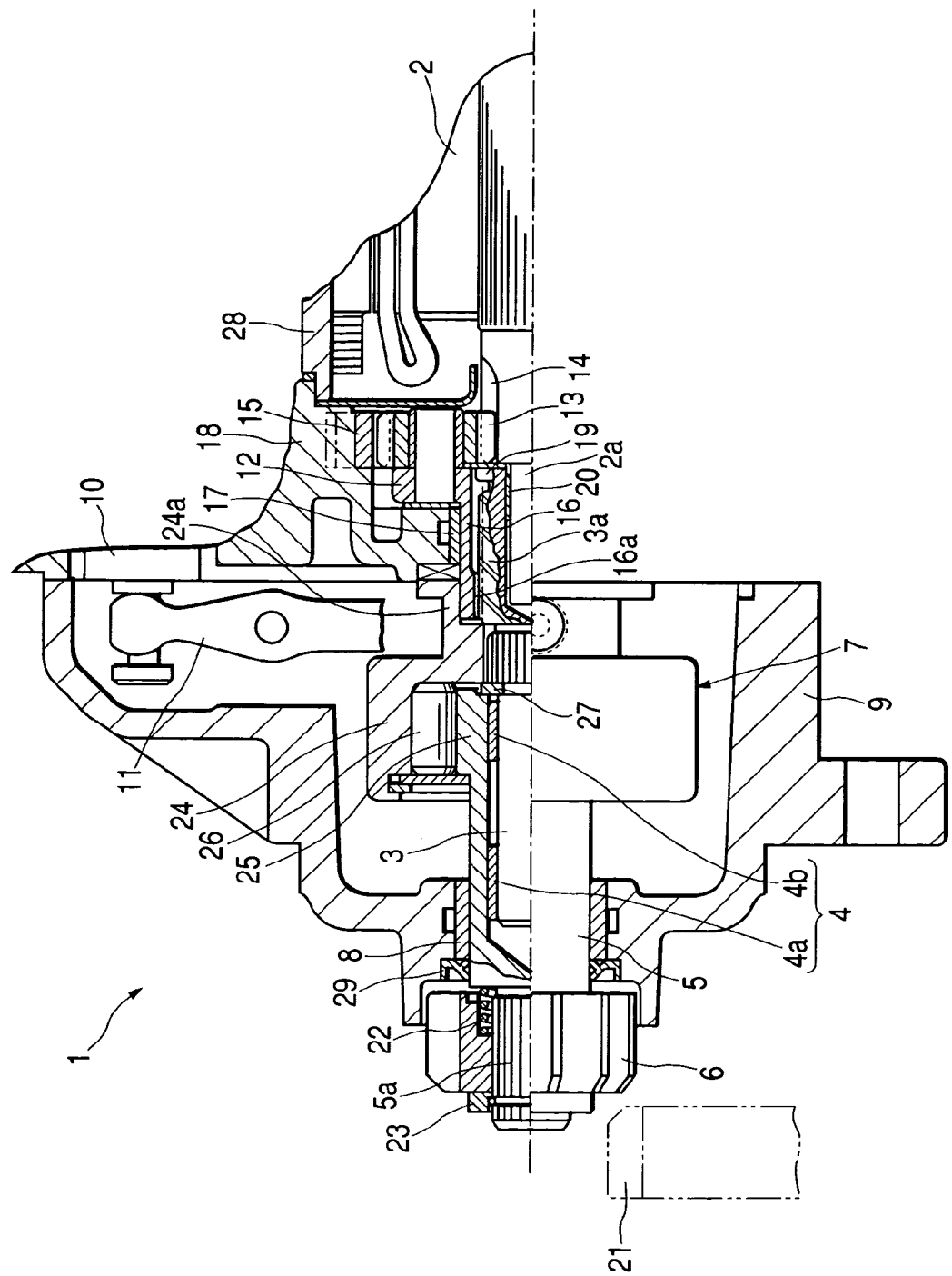
FIG. 1 is a cross-sectional view showing a starter in a pinion resting condition according to an embodiment of the present invention.

FIG. 1 is a cross-sectional view showing a starter 1 according to an embodiment of the present invention.

In FIG. 1, the starter 1 according to this embodiment is made up of a motor for generating a rotating force for an armature 2, a planetary reduction assembly (which will be described later) for reducing the rotation of the armature 2, an output shaft 3 to which the rotating force after the reduction by the reduction assembly is transmitted, a pinion shaft 5 fitted through a pinion bearing 4 over an outer circumference of the output shaft 3 to be rotatable, a pinion 6 fixedly secured to a tip portion (an opposite-of-motor side end portion) of the pinion shaft 5, a one-way clutch 7 for transmitting the rotation of the output shaft 3 to the pinion shaft 5, a housing 9 for supporting the pinion shaft 5 through a housing bearing 8 so that the pinion shaft 5 is rotatable and slidable, and others.

The motor is a well-known DC motor, and when a motor contact built in an electromagnetic switch (not shown) is placed at its closure position by manipulating an IG key (not shown) to an ON position, a current flows from a vehicle-mounted battery to the armature 2 so that a rotating force develops in the armature.

The electromagnetic switch internally includes a coil (not shown) in which a current flows by the ON operation of the IG key, a plunger 10 (see FIG. 1) located to be capable of shuttling inside the coil, and others. When the coil is energized so that an attraction force works on the plunger 10, the plunger 10 is moved in a right-hand direction in the illustration while flexing a drive spring (not shown) to close the motor contact, and the attraction is transmitted through a lever 11, connected to the plunger 10, to the one-way clutch 7 to work as a force to push out the one-way clutch 7 in the opposite-of-motor direction (in the left-hand direction in FIG. 1).

The planetary reduction assembly includes a planetary gear 13 supported by a carrier 12, and in a manner such that this planetary gear 13 engages with a sun gear 14 and an internal gear 15 to revolve around the sun gear 14 while rotating on its own axis, thereby reducing the rotation of the armature 2 and transmitting it to the carrier 12.

The carrier 12 is integrated with a power transmission device 16 made to transmit the rotating force, reduced by the reduction assembly, to the output shaft 3.

The power transmission device 16 is formed into a cylindrical configuration to extend at an inner diameter portion of the carrier 12 toward the opposite-of-motor side, and an outer circumference of the cylindrical configuration thereof is supported through a bearing 17 by a center case 18. In this power transmission device 16, an inner helical spline 16a is formed in its opposite-of-motor side inner circumferential surface.

On the other hand, in the output shaft 3, an outer helical spline 3a is formed in its rear end portion (motor-side end portion) so that the outer helical spline 3a engages with the inner helical spline 16a of the power transmission device 16, and the output shaft 3 is movable by a predetermined quantity in axial directions with respect to the power transmission device 16. A stopper 19 is placed at the rear end portion of the output shaft 3 in order to limit the movement of the output shaft 3 with respect to the power transmission device 16.

In addition, in the output shaft 3, a hollow portion is made on the inner diameter side of the rear end portion having the outer helical spline 3a, and in a state where a bearing 20 is put on an inner circumferential surface of the hollow portion under pressure, a tip shank 2a of the armature 2 is inserted thereinto. The tip shank 2a of the armature 2 has a length corresponding to the moving distance of the output shaft 3 plus the axial length of the bearing 20 so as to prevent the bearing 20 from separating from the tip shank 2a when the output shaft 3 is moved in the opposite-of-motor direction.

The pinion shaft 5 is equipped with a shank 5a having a straight spline at its tip portion, and the rear side of this shank 5a is formed into a cylindrical configuration to accommodate an outer circumference of the output shaft 3 in a state where the pinion bearing 4 (bush, needle bearing, or the like) is put on an inner circumference of the cylindrical configuration under pressure.

Figure 2:
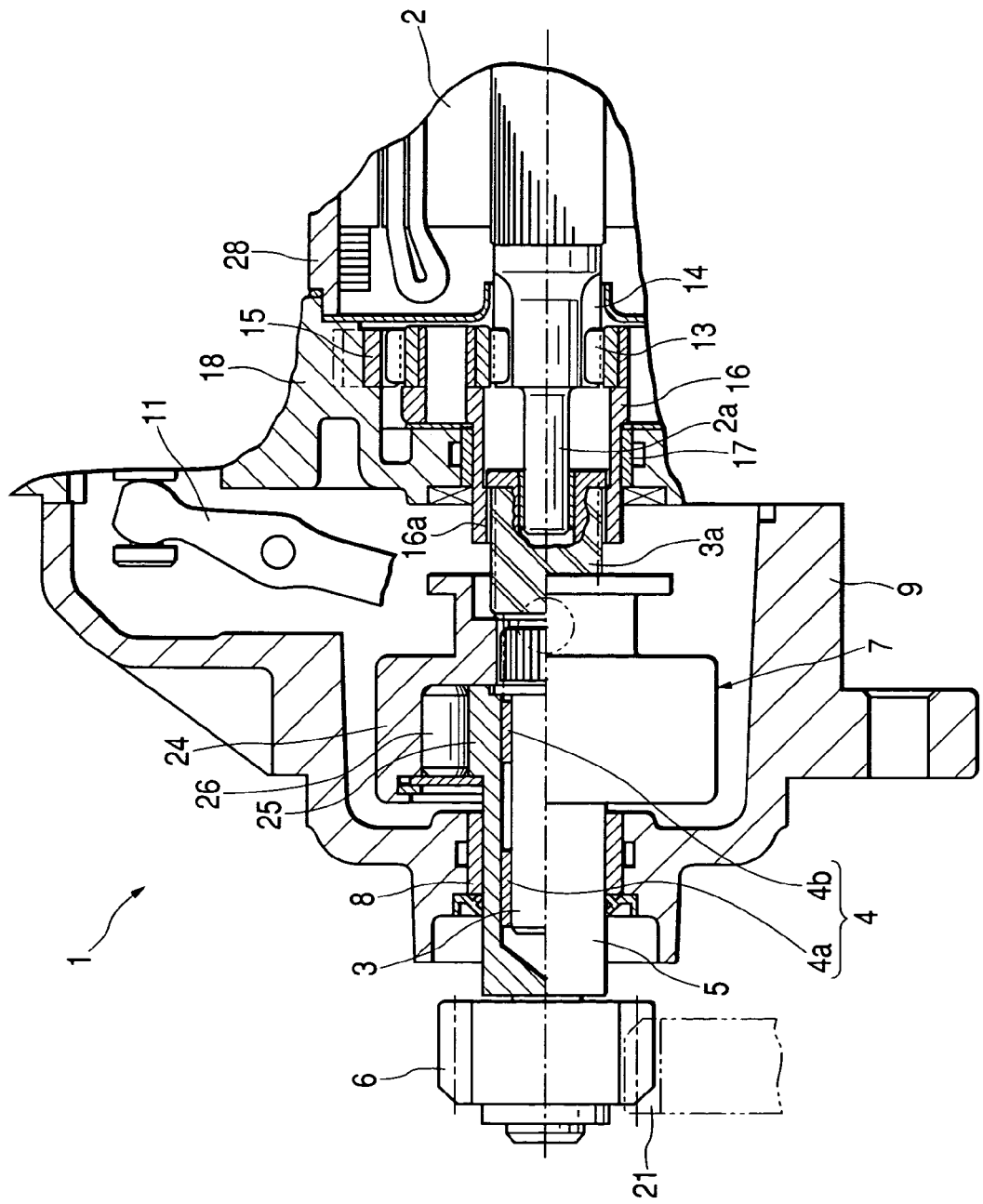
FIG. 2 is a cross-sectional view showing the starter in a cranking condition according to the embodiment of the present invention.

The pinion bearing 4 is composed of a first bearing 4a for supporting the tip portion of the output shaft 3 and a second bearing 4b located on the motor side with respect to the first bearing 4a. In this case, the first bearing 4a is located such that its own pinion-side end portion protrudes from the pinion-side end portion of the housing bearing 8 toward the pinion side in a state where the pinion 6 engages with the ring gear 21 of the engine (see FIG. 2).

The pinion 6 is spline-connected to the shank 5a of the pinion shaft 5 and is biased in the opposite-of-motor direction by a pinion spring 22 and its movement is limited by a stopper 22 attached to the tip side of the pinion 6.

The one-way clutch 7 is a well-known roller type clutch which has been used for most of starters, and is composed of an outer portion 24, an inner portion 25, a roller 26 and others.

The outer portion 24 is spline-connected to the output shaft 3 to be rotated integrally with the output shaft 3, and its axial movement is limited by an opposite-of-motor side end surface of the outer helical spline 3a and a snap ring 27 mounted on the output shaft 3. Moreover, in the outer portion 24, a cylindrical portion 24a is provided on the motor side of a coupling portion spline-connected to the output shaft 3 and this cylindrical portion 24a covers the opposite-of-motor side end portion of the power transmission device 16 when the pinion 6 is in a resting condition (state shown in FIG. 1).

The inner portion 25 is integrated with the rear end portion of the pinion shaft 5 and is located on the inner diameter side of the outer portion 24.

The roller 26 places the outer portion 24 and the inner portion 25 into a locked condition in a manner such that it being pressed against a portion between the inner portion 25 and the outer portion 24 when the outer portion 24 is rotated integrally with the output shaft 3 at the time of the engine starting, thereby transmitting the rotation of the outer portion 24 to the inner portion 25. Following this, when the speed of rotation of the pinion shaft 5 exceeds the speed of rotation of the output shaft 3 by the starting of the engine, slip occurs between the inner portion 25 and the outer portion 24, thus cutting off the power transmission therebetween.

In the housing 9, the housing bearing 8 is placed between the pinion 6 and the one-way clutch 7 to support the pinion shaft 5, and the center case 18 is provided between the housing 9 and a motor yoke 28 to cover a periphery of the one-way clutch 7.

Although a bush is shown in FIG. 1, a ball bearing or needle bearing can also be used as the housing bearing 8. A rubber-made seal member 29 is placed on the pinion side of the housing bearing 8 to seal a gap portion between the housing bearing 8 and the pinion shaft 5, thereby preventing water, dust or the like from entering into the interior of the housing 9.

Secondly, a description will be given hereinbelow of an operation of the starter 1.

When the coil of the electromagnetic switch is energized by the ON operation of the IG key to attract the plunger 10, this attraction force is transmitted through the lever connected to the plunger 10 to the outer portion 24 of the one-way clutch 7 and, hence, the pushing force in the opposite-of-motor direction is applied from the outer portion 24 through the snap ring 27 to the output shaft 10. Therefore, the output shaft 3, together with the one-way clutch 7, is pushed out forwardly and the outer portion 24 is further brought into contact with the rear end surface of the pinion shaft 5 to push out the pinion shaft 5 so that these three components integrally move forwardly and, after the pinion 6 comes into contact with the ring gear 21, stop while shrinking the pinion spring 22.

On the other hand, when the plunger 10 moves while flexing the drive spring to close the motor contact, the armature 2 is energized to rotate, and the rotation of the armature 2 is reduced by the reduction assembly and is then transmitted to the power transmission device 16. Owing to the rotation of the power transmission device 16, a rotating force is transmitted to the output shaft 3 helical-spline-connected to the power transmission device 16 and is further transmitted from the output shaft 3 through the one-way clutch 7 to the pinion shaft 5. Following this, when the pinion 6 is rotated up to a position where it can engage with the ring gear 21, the effects of the helical splines 3a and 16a generate a thrust force to push out the output shaft 3 forwardly, and the reaction force of the drive spring and the reaction force of the pinion spring 22 are added to the thrust force, thereby pushing the pinion 6 to engage with the ring gear 21 (see FIG. 2). Thus, the rotating force of the pinion shaft 5 is transmitted from the pinion 6 to the ring gear 21 to crank the engine.

The effects of this embodiment are as follows. That is, the starter 1 according to this embodiment has a construction in which the output shaft 3 is moved integrally with the pinion shaft 5 and the one-way clutch 7 with respect to the power transmission device 16, and the relative position between the pinion shaft 5 and the output shaft 3 does not vary between the pinion resting condition shown in FIG. 1 and the engine starting condition (cranking condition) shown in FIG. 2. Therefore, the first bearing 4a and the second bearing 4b do not vary in relative position with respect to the output shaft 3. This enables the first bearing 4a and the second bearing 4b to firmly support the pinion shaft 5 not only in the pinion resting condition but also in the engine starting condition (cranking).

With this construction, when the pinion 6 engages with the ring gear 21, the pinion-side end portion of the first bearing 4a can be protruded toward the pinion side with respect to the pinion-side end portion of the housing bearing 8 so that the first bearing 4a and the second bearing 4b can receive a load applied from the ring gear 21 to the pinion 6 and the pinion shaft 5 at the cranking. Therefore, even if a high load acts on the pinion 6, the inclination of the pinion shaft 5 is reducible owing to the supporting by the output shaft 3. In particular, since the first bearing 4a can be supported by the tip portion of the output shaft 3 with respect to the pinion shaft 5, it is possible to further suppress the inclination of the pinion shaft 5. As a result, the inclination thereof due to a load applied to the roller portion of the one-way clutch 7 is suppressible to reduce the half-striking of the roller 26 against the outer portion 24 and the inner portion 25, thus preventing the slippage of the one-way clutch 7 and enabling a higher torque.

In addition, the one-way clutch 7 has the cylindrical portion 24*a* to cover the outer diameter portion of the opposite-of-motor side end portion of the power transmission device 16 in the pinion resting condition. With this construction, since the opposite-of-motor side end portion forming the engaging section between the power transmission device 16 and the output shaft 3, helical-spline-fitted, is covered with the cylindrical portion 24*a*, it is possible to protect the helical-spline-fitting section from water, dust or the like entering into the interior of the housing 9, thus maintaining a satisfactory sliding characteristic of the helical-spline-fitting section.

Still additionally, in this embodiment, after the output shaft 3 is pushed out forwardly at the time of cranking the engine so that the pinion 6 comes into contact with the ring gear 21, when the rotating force of the armature 2 is transmitted through the power transmission device 16 to the output shaft 3, a thrust force develops to push out the output shaft 3 forwardly because of the effects of the helical splines 3*a* and 16*a* (twist angle: approximately 30°) engaging with each other. This trust force is added to the reaction force of the drive spring and acts as a force to press the pinion spring 22. That is, the pinion 6 pushing force increases, thereby improving the engaging characteristic of the pinion 6 with the ring gear 21.

In the starter 1 according to this embodiment, a hollow portion is made in the rear end portion of the output shaft 3 and the tip shank 2*a* of the armature 2 is inserted through the bearing 20 into that hollow portion. With this construction, there is no need to align the end surface of the output shaft 3 with the end surface of the tip shank 2*a* of the armature 2, which permits shortening the axial length of the starter 1. Moreover, since the hollow portion is made in the rear end portion of the output shaft 3, the weight reduction of the output shaft 3 is feasible. In this case, the total weight of the moving body (the output shaft 3, the pinion shaft 5, the pinion 6, the one-way clutch 7) moving in the opposite-of-motor direction at the time of the engine starting is reducible, which improves the engagement between the opinion 6 and the ring gear 21.

Although in this embodiment the output shaft 3 is helical-spline-connected to the power transmission device 16 and the pinion 6 is straight-spline-connected to the shank 5*a* of the pinion shaft 5, even if the power transmission device 16 and the output shaft 3 are coupled to each other through the use of a straight spline and the shank 5*a* of the pinion shaft 5 and the pinion 6 are coupled to each other through a helical spline, the effects equivalent thereto are attainable (except the effect of generating a thrust force to push out the output shaft 3 forwardly after the pinion 6 comes into contact with the ring gear 21).

Figure 3:
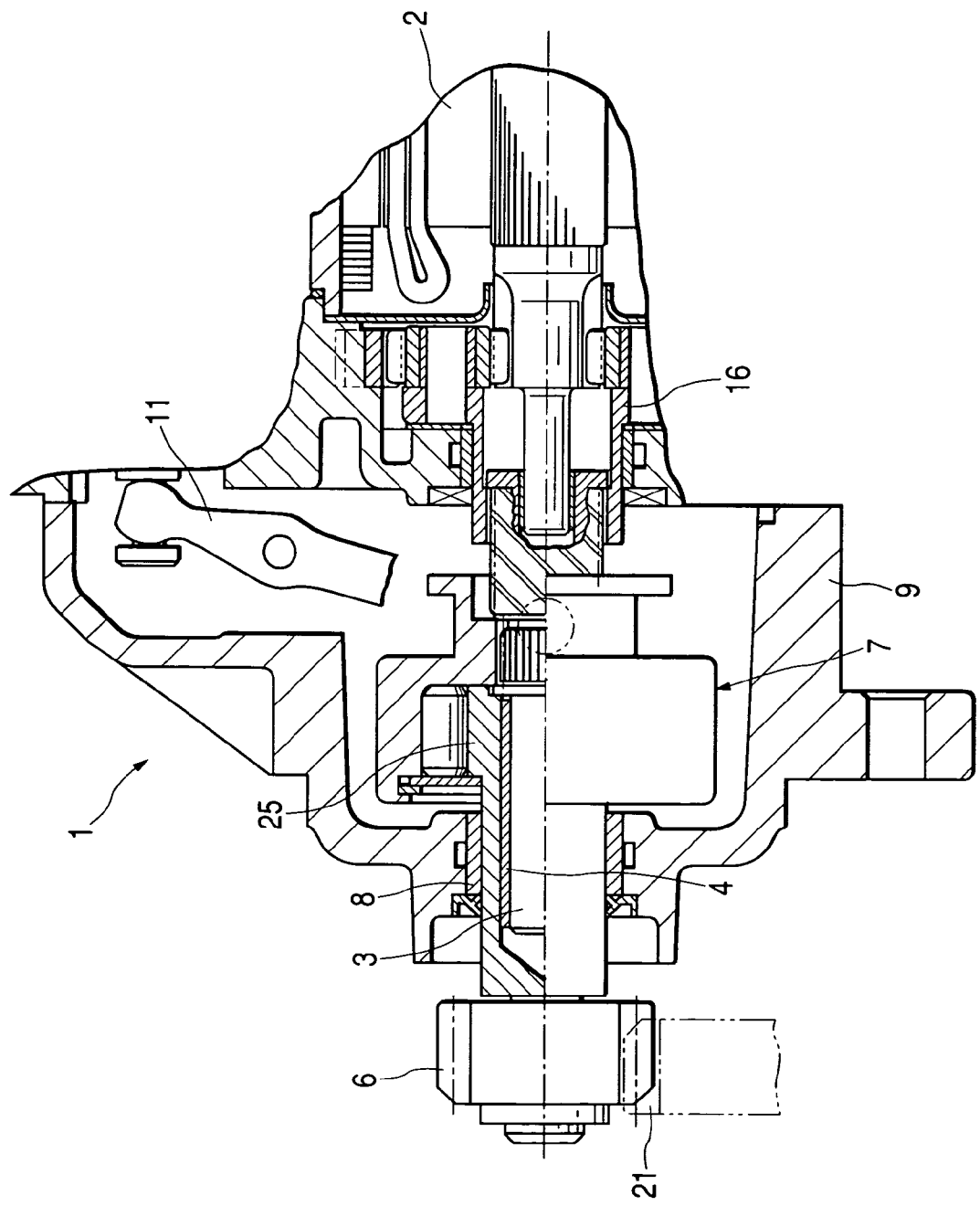
FIG. 3 is a cross-sectional view showing the starter in a cranking condition according to the embodiment of the present invention.
Figure 4:
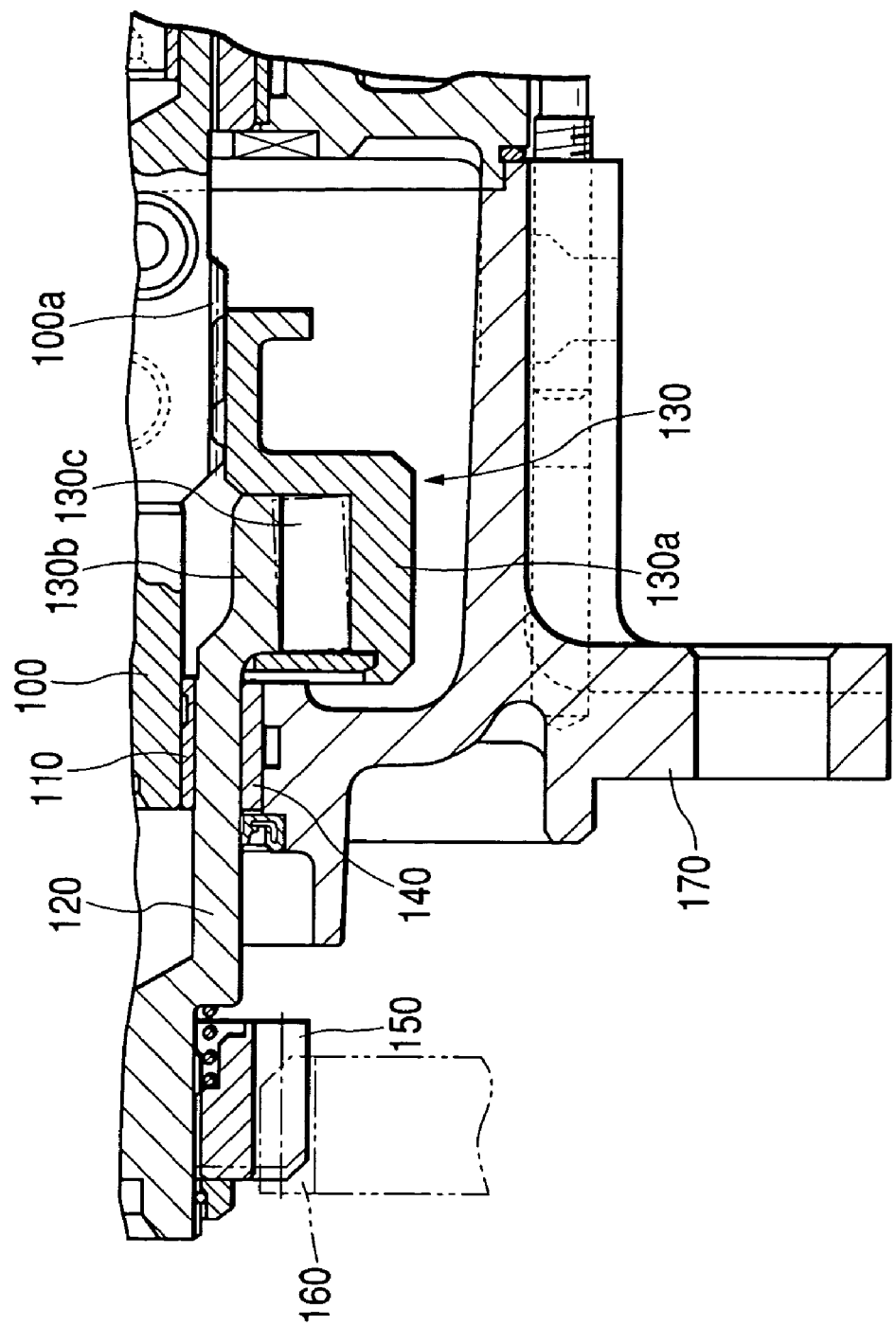
FIG. 4 is a partial cross-sectional view showing a starter according to a conventional technique.

Moreover, although the first bearing 4*a* and the second bearing 4*b* are illustrated as the pinion bearing 4, it is also appropriate that a third bearing is interposed therebetween, or that, as shown in FIG. 3, a section from the first bearing to the second bearing is constructed as one pinion bearing 4.

It should be understood that the present invention is not limited to the above-described embodiment, and that it is intended to cover all changes and modifications of the embodiment of the invention herein which do not constitute departures from the spirit and scope of the invention.

What is claimed is:

1. A starter comprising:
    a motor for generating a rotating force for an armature;
    a planetary reduction assembly for reducing rotation of said armature through a planetary gear;
    a power transmission device formed into a cylindrical configuration and integrated with a carrier made to support said planetary gear for transmitting rotation of said carrier;
    an output shaft whose motor-side end portion is spline-fitted in an inner circumference of said power transmission device so that said output shaft is movable by a predetermined quantity in its axial directions with respect to said power transmission device;
    a pinion shaft fitted through a pinion bearing over an outer circumferential surface of said output shaft to be rotatable;
    a pinion provided at an end portion of said pinion shaft on an opposite side to said motor to be rotated integrally with said pinion shaft;
    a one-way clutch for transmitting rotation of said output shaft to said pinion shaft; and
    a housing including a housing bearing located between said pinion and said one-way clutch to support said pinion shaft so that said pinion shaft is rotatable and slidable,
    said output shaft being made to be moved integrally with said pinion shaft and said one-way clutch in an opposite-of-motor side direction when an engine is placed into a cranking condition so that said pinion engages with a ring gear of said engine.

2. The starter according to claim 1, wherein, when said pinion shaft, together with said output shaft, is moved in the opposite-of-motor direction up to a position at which said pinion engages with said ring gear, a pinion-side end portion of said pinion bearing protrudes toward a pinion side with respect to a pinion-side end portion of said housing bearing.

3. The starter according to claim 1, wherein said pinion bearing includes a first pinion bearing for supporting an opposite-of-motor side end portion of said output shaft and a second pinion bearing located on a motor side with respect to said first pinion bearing.

4. The starter according to claim 1, wherein said pinion bearing is made to support a portion between an opposite-of-motor side end portion of said output shaft and an inner diameter side of an inner portion constituting said one-way clutch.

5. The starter according to claim 1, wherein said one-way clutch has a cylindrical portion to cover an outer diameter portion of an opposite-of-motor end portion of said power transmission device when said pinion is in a resting condition.

6. The starter according to claim 1, wherein a motor-side end portion of said output shaft, which has said spline, is recessed into a cylindrical configuration and an end portion of a shaft of said armature is inserted through a bearing into the interior of said cylindrical configuration.

* * * * *